Jan. 15, 1952 F. H. RICE 2,582,562

TELEPHONE TRAY AND RETRACTABLE MEMO PAD

Filed Jan. 23, 1948 2 SHEETS—SHEET 1

INVENTOR.
Frederick H. Rice.
BY
H. A. Druckman
ATTORNEY.

Jan. 15, 1952 F. H. RICE 2,582,562
TELEPHONE TRAY AND RETRACTABLE MEMO PAD
Filed Jan. 23, 1948 2 SHEETS—SHEET 2

INVENTOR.
Frederick H. Rice.
BY
H. L. Druckman
ATTORNEY.

Patented Jan. 15, 1952 2,582,562

UNITED STATES PATENT OFFICE 2,582,562

TELEPHONE TRAY AND RETRACTABLE MEMO PAD

Frederick H. Rice, Van Nuys, Calif.

Application January 23, 1948, Serial No. 4,047

2 Claims. (Cl. 45—.5)

This invention relates to a telephone tray in which a memo pad is retractably mounted.

An object of my invention is to provide a novel device of the character stated, including a tray in which the base of the telephone fits, and in which a shelf is provided which can slide inwardly or outwardly to hide or expose a memo pad, as desired by the user.

Another object of my invention is to provide a novel device of the character stated, in which the shelf which holds the memo pad is held in retracted position against spring pressure, and is released by a trigger and then automatically moves out into useable position.

A feature of my invention is to provide a device of the character stated in which the base of the telephone is pressed and thereafter is moved around with the telephone from place to place, as desired.

Still another object is to provide a novel device of the character stated, which is simple in construction, inexpensive to manufacture, and effective in operation.

Other objects, advantages and features of invention may appear from the accompanying drawing, the subjoined detailed description and the appended claims.

In the drawing

Figure 1:
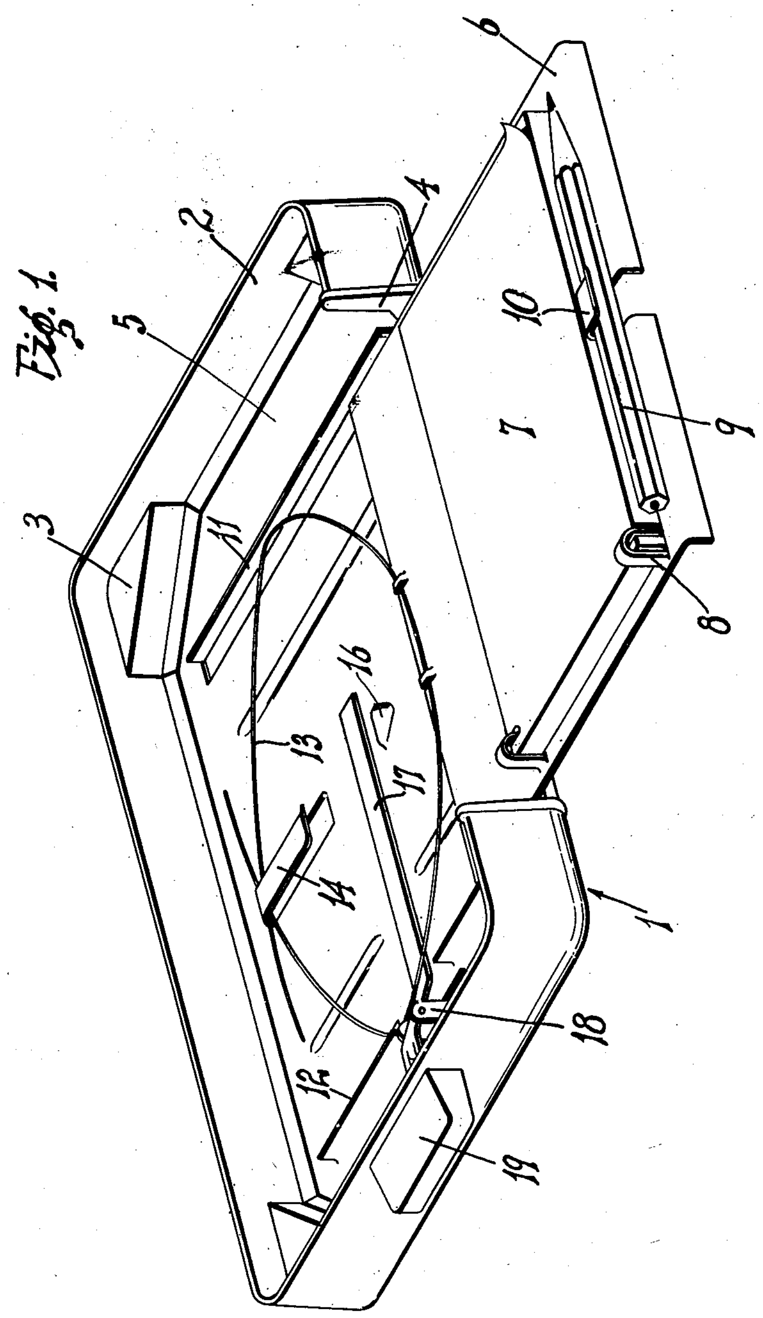
Figure 1 is a perspective view of my telephone tray and memo pad.
Figure 2:
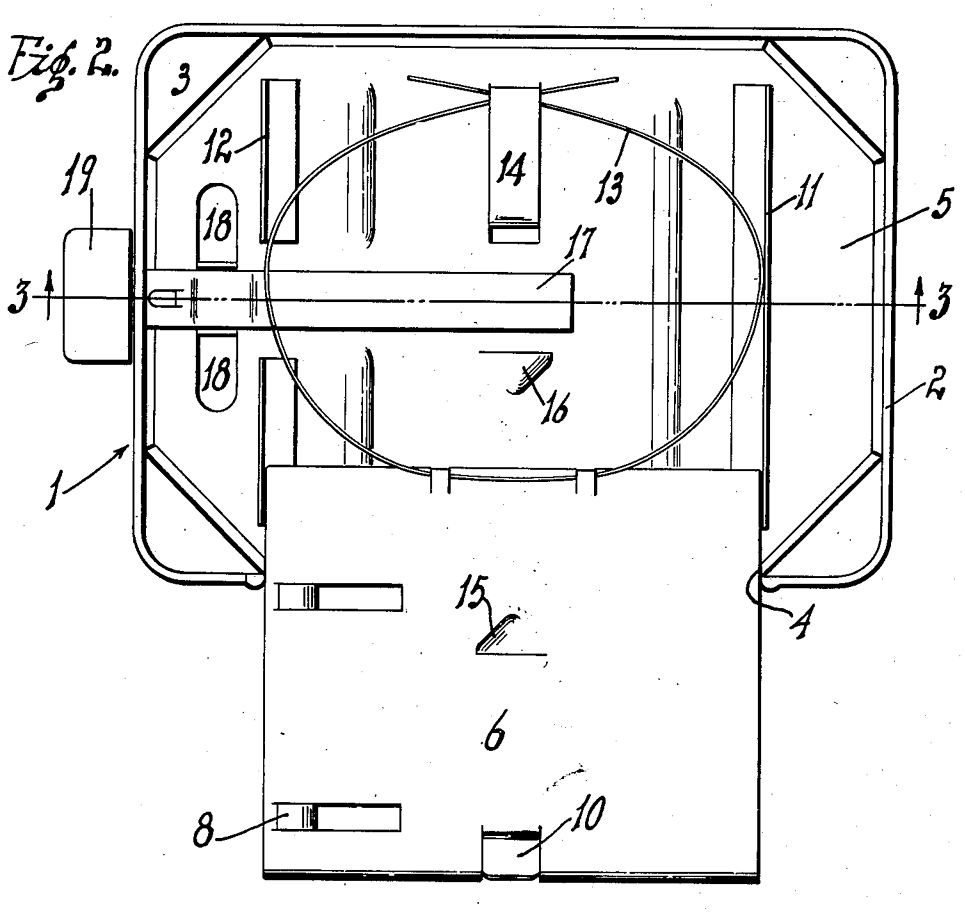
Figure 2 is a top plan view of the same.
Figure 3:
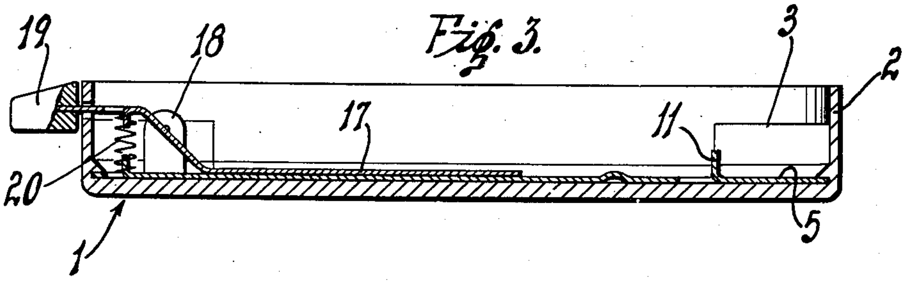
Figure 3 is a sectional view taken on line 3—3 of Figure 2.

Referring more particularly to the drawing, the numeral 1 indicates a tray, preferably rectangular in shape, and formed of a moldable material, such as rubber, plastic, or the like. The shape of the tray conforms exactly to the shape of a telephone box, and the telephone box can be pressed into the tray, the walls 2 of the tray gripping the sides of the telephone box, thus holding the entire assembly on the telephone so that it may be transported from place to place as desired. Four triangular shelves 3 are integrally formed with the tray 1, and are positioned in each corner of the tray, substantially as shown. These shelves space the bottom of the telephone box (not shown) a distance above the bottom of the tray so that the telephone box will not interfere with the memo pad mechanism to be subsequently described.

An opening 4 is left in one wall of the tray 1, and the memo pad to be subsequently described moves through this opening. A metal plate 5 is positioned in the bottom of the tray 1, and may be positioned in the mold, and the material of the tray molded around it, if desired, or it may be fitted into the tray after it is molded. However this metal plate is fixedly positioned in the tray.

A memo pad shelf 6 is slidable mounted on the plate 5 and moves through the opening 4. A memo pad 7 is mounted on the shelf 6 and this pad is held in clips 8, which rise from the shelf 6. A pencil 9 may also be held on the shelf 6 by the clip 10. Guide strips 11, 12 are struck upwardly from the plate 5, and act as guides for the shelf 6 as this shelf moves horizontally. A loop spring 13 bears against the rear edge of the shelf 6 and is fitted under a tongue 14, which is struck upwardly from the plate 5. The spring 13 is thus held against displacement as the shelf 6 moves back and forth.

A shoulder or lug 15 is formed on the bottom of the shelf 6 and preferably by pressing the material of the shelf downwardly to form the lug. A complementary lug 16 is struck upwardly from the metal plate 5, and when the shelf 6 is pushed inwardly, the lug 15 will engage the lug 16 and hold the shelf in retracted position against the tension of the spring 13. To release the shelf, it is lifted slightly so that the lug 15 disengages the lug 16. This lifting of the shelf is accomplished by the finger 17, which extends transversely across the plate 5 and under the shelf 6. The finger is pivotally mounted on ears 18—18, which rise from the plate 5. The finger 17 extends out through one wall 2 of the tray 1, and a button 19 is secured to the outer end of the finger. A coil spring 20 bears against the finger 17 and normally holds the finger in depressed position.

When the lugs 15, 16 are engaged, the shelf 6 will be held within the tray 1. By pushing downwardly on the button 19, the finger 17 will raise the shelf 6 slightly enough to disengage the lug 15 from the lug 16. The spring 13 will then urge the shelf 6 outwardly to its extended position, shown in Figure 1. The memo pad 7 is now available for use.

Having described my invention, I claim:

1. A telephone tray and memo pad comprising a rectangular tray shaped to fit the box of a telephone and frictionally engage the same, a metal plate in the bottom of said tray, said tray having an opening in one side thereof, a memo pad shelf slidably mounted in said opening and on said metal plate, a spring engaging the shelf and urging the same outwardly, a lug depending from the shelf, a second lug extending upwardly from the metal plate, said lugs engaging when the shelf is in retracted position, and a finger extending into the tray and under the shelf, means pivotally mounting the finger on the metal plate, said finger being adapted to lift the shelf and disengage the lugs to permit the shelf to be moved outwardly, and guide strips struck upwardly from said plate, said shelf moving between the guide strips, and a pad in each corner of the tray on which the telephone box rests.

2. A telephone tray and memo pad comprising a rectangular tray, formed of resilient material to frictionally grip the box of a telephone, a pad integrally formed in each corner of the tray on which the box rests, a metal plate in the bottom of the tray, said tray having an elongated opening in one side thereof, a memo pad shelf slidably mounted on the metal plate and extendable through said opening, a spring mounted on said plate and bearing against the rear edge of the shelf and urging the same outwardly, an upwardly extending lug formed on the metal plate, a second downwardly extending lug on the shelf, said lugs inter-engaging to hold the shelf in retractable position, a finger extending into the tray and under the shelf, means pivotally mounting said finger on the metal plate, a button on the outer end of said finger whereby the finger may be raised to lift the shelf out of engagement with the first named lug, thus permitting the shelf to be pressed outwardly by said spring.

FREDERICK H. RICE.

REFERENCES CITED

The following references are of record in the file of this patent:

UNITED STATES PATENTS

| Number | Name | Date |
|---|---|---|
| 470,728 | Weiss | Mar. 15, 1892 |
| 1,363,524 | McNamara | Dec. 28, 1920 |
| 1,434,265 | Rosine et al. | Oct. 31, 1922 |
| 1,641,249 | Blumental | Sept. 6, 1927 |
| 2,130,920 | Faye | Sept. 20, 1938 |
| 2,479,752 | Lohr | Aug. 23, 1949 |
| 2,498,770 | Sloane et al. | Feb. 28, 1950 |

FOREIGN PATENTS

| Number | Country | Date |
|---|---|---|
| 24,804 | Great Britain | Oct. 29, 1912 |